United States Patent
Demarcken et al.

(10) Patent No.: US 7,840,587 B2
(45) Date of Patent: *Nov. 23, 2010

(54) QUERY CACHING FOR TRAVEL PLANNING SYSTEMS

(75) Inventors: Carl G. Demarcken, Arlington, MA (US); Justin A. Boyan, Providence, RI (US)

(73) Assignee: ITA Software, Inc., Cambridge, MA (US)

( * ) Notice: Subject to any disclaimer, the term of this patent is extended or adjusted under 35 U.S.C. 154(b) by 1703 days.

This patent is subject to a terminal disclaimer.

(21) Appl. No.: 10/456,980

(22) Filed: Jun. 6, 2003

(65) Prior Publication Data

US 2004/0249798 A1    Dec. 9, 2004

(51) Int. Cl.
*G06F 17/30* (2006.01)
(52) U.S. Cl. ..................................... 707/768
(58) Field of Classification Search ............ 707/2; 705/5, 6
See application file for complete search history.

(56) References Cited

U.S. PATENT DOCUMENTS

| | | | | |
|---|---|---|---|---|
| 6,119,094 A * | 9/2000 | Lynch et al. | ............ | 705/5 |
| 6,295,521 B1 * | 9/2001 | DeMarcken et al. | ............ | 705/6 |
| 6,307,572 B1 * | 10/2001 | DeMarcken et al. | ......... | 715/763 |
| 6,377,932 B1 * | 4/2002 | DeMarcken | ............ | 705/5 |
| 6,381,578 B1 * | 4/2002 | DeMarcken | ............ | 705/6 |
| 6,418,413 B2 * | 7/2002 | DeMarcken et al. | ............ | 705/5 |
| 6,609,098 B1 * | 8/2003 | DeMarcken | ............ | 705/6 |
| 6,839,679 B1 * | 1/2005 | Lynch et al. | ............ | 705/5 |
| 2002/0016724 A1 * | 2/2002 | Yang et al. | ............ | 705/6 |

OTHER PUBLICATIONS

Arthur M. Keller and Julie Basu, "A predicate-based caching scheme for client-server database architectures", 1996, The VLBD Journal vol. 5, pp. 35-47.*
Paul Francis and Shin-ya Sato, "Design of a Database and Cache Management Strategy for a Global Information Infrastructure", 1997, IEEE, pp. 283-290.*
Louis Degenaro, Arun Iyengar, Ilya Lipkind, and Isabelle Rouvellou, "A Middleware System Which Intelligently Caches Query Results", 2000, LNCS 1795, pp. 24-44.*
U.S. Appl. No. 10/457,016, filed Jun. 6, 2003, Carl G. de Marcken and Justin Boyan.
U.S. Appl. No. 10/456;975, filed Jun. 6, 2003, Carl G. de Marcken and Justin Boyan.
U.S. Appl. No. 10/456,975, filed Jun. 6, 2003, Carl G. de Marcken and Justin Boyan.

* cited by examiner

*Primary Examiner*—Neveen Abel Jalil
*Assistant Examiner*—Farhan M Syed
(74) *Attorney, Agent, or Firm*—Fish & Richardson P.C.

(57) ABSTRACT

A query cache for travel planning includes a cache database that stores query results and a cache test mechanism that receives a travel planning query and uses the query to find a result in the cache database and if a result is found returns the result, the result including a set of answers each answer in the set having a flight and a fare useable with the flight.

36 Claims, 10 Drawing Sheets

QUERY CACHING FOR TRAVEL PLANNING SYSTEMS

BACKGROUND

This invention relates to travel scheduling and pricing, and more particularly to processing low-fare-search queries for air travel planning computer systems.

In travel planning such as for air travel scheduling, flight pricing and low-fare-search, queries are posed by users from travel agent systems, airline reservation agent systems, travel web sites, and airline-specific web sites. Low-fare-search (LFS) queries typically include origin and destination information, time constraints, and additional information including passenger profiles and travel preferences. Travel planning systems respond to these LFS queries and typically return a list of possible tickets that satisfy the query, each a flight combination with price information. Some travel planning systems return answers in a compact form such as through a pricing graph.

Travel planning systems expend considerable computational resources responding to LFS queries. It is not uncommon for a travel planning system to spend more than 30 seconds responding to an LFS query, even for a relatively straightforward round-trip query leaving and returning from specific airports on specific dates. Since travel planning systems may need to answer tens or hundreds of queries per second, they are typically built from expensive farms of hundreds or thousands of computers. It is therefore desirable to reduce the computational and economic costs of responding to LFS queries. It is also desirable to reduce query latency, so that answers are returned to the user as quickly as possible.

One type of caching that is known is caching of airline seat availability data. With airline seat availability data query responses become stale if some change takes place in the remote databases accessed over the network (the airlines' seat availability databases).

SUMMARY

According to an aspect of the present invention, a method for testing freshness of query results in a travel planning query cache includes retrieving a result for a query from a cache database; if a cached result is found, testing the retrieved result to determine whether at least one answer in the result is stale or sufficiently fresh to be returned as an answer to the query, and if at least some of the answers are stale or if no result is found, indicating a cache miss.

According to an additional aspect of the present invention, a computer program product residing on a computer readable medium for testing freshness of query results in a travel planning query cache includes instructions for causing a computer to retrieve a result for a query from a cache database; if a cached result is found, test the retrieved result to determine whether at least one answer in the result is stale or sufficiently fresh to be returned as an answer to the query, and if at least some of the answers are stale or if no result is found, indicate a cache miss.

According to an additional aspect of the present invention,
a. travel planning query cache includes a cache database and a management process that retrieves cached results from the cache database in response to a user query and if a retrieved cached result is found that satisfies the query, tests the retrieved cached result to determine whether at least one answer in the result is stale or sufficiently fresh to be returned as an answer to the query, and if at least some of the answers are stale or if no result is found, indicates a cache miss.

With caching of airline seat availability, data from seat availability query responses become stale if some change takes place in remote databases accessed over the network. Since the cache can only access these databases through the very network that the cache is trying to reduce transactions on, the cache determines staleness using estimation techniques that are not guaranteed to be correct, such as by using statistical techniques to estimate the probability of staleness based on the age of the query. In contrast, for the caching of travel planning queries, while similar estimation techniques may be used to determine query staleness, other techniques that directly examine the travel database are preferred, such as direct and re-query testing discussed below.

In some circumstances the computational cost of travel queries can be reduced by caching queries and their results in a database, and reusing the results for subsequent identical or similar queries. However query caching is not straightforward, nor universally advantageous. First, for some types of travel planning queries the set of possible queries (the query "space") is sufficiently large relative to the number of queries actually posed that there is little chance of duplicate queries, and therefore no computational benefit to caching as queries will never "hit" the cache. Second, the travel database used by a travel planning system to answer queries is in constant flux, as schedules, fares (prices), and seat availability change in real time. For this reason, the response to a query may be stale (may no longer be the correct result) at the time of the next identical query.

Nevertheless, aspects of this invention enable query caching to be a valuable and effective tool for reducing computational load in travel planning systems, especially LFS queries in air travel planning systems, for which the computational cost of answering a query is extremely high.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
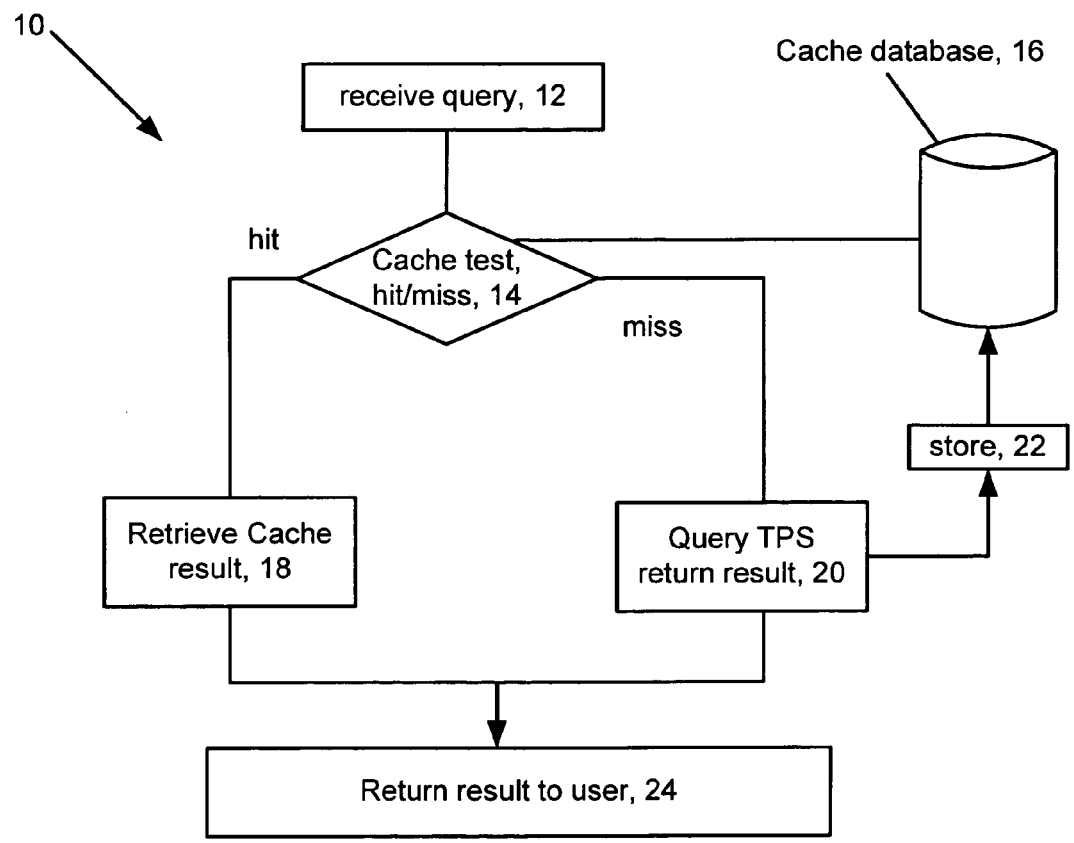
FIG. 1 is a flow chart of query caching.

Referring to FIG. 1, a travel planning system query cache arrangement 10 is shown. A user sends a query that is received 12 by a cache test mechanism 14. The cache test mechanism 14 looks for a cached query result in a cache database 16. If the cache query result is found in the cache database 16, (a cache hit) the result is retrieved 18. Otherwise if no result is cached in the database 16 (a cache miss), a query 12 is posed 20 to the travel planning system 20 to produce an actual result.

The actual result is stored 22 in the cache database 16 and returned 24 to the user. A query 12 is a request by a user, for a travel accommodation. The query generally has information such as origins, destination, travel dates and other preferences or conditions of travel requested by the user, e.g., nonstop, first class, etc. An answer is a particular travel plan that satisfies the request, generally a combination of flights and fares. The answer includes information such as flights, (flight number, airline, etc.) and fares that can be used with the flights. A query result is a set of such answers. A cached result is a query result stored in the database. The cached results in the database are obtained in response to earlier queries, either performed preemptively or in response to user supplied queries. A cached result is substituted for an actual result that would be received from a travel planning system (TPS) had the TPS actually processed the query Referring also to FIG. 2, a cache mechanism tests the freshness of a result received from a cache database 16. A retrieval mechanism 32 searches for a result for the query in the cache database 16. If no result is found 34 the cache test mechanism indicates a cache "miss." As was mentioned in FIG. 1 a query is made to a TPS, 20 and the result and query are stored 22 in the cache database 16. If a cached result is found, "a cache hit", then the result is passed to a staleness test mechanism 36, which uses the query, cached result and age 38 of the cached result to determine whether the result is stale 37 or sufficiently fresh 39 to be returned to the user.

Figure 2:
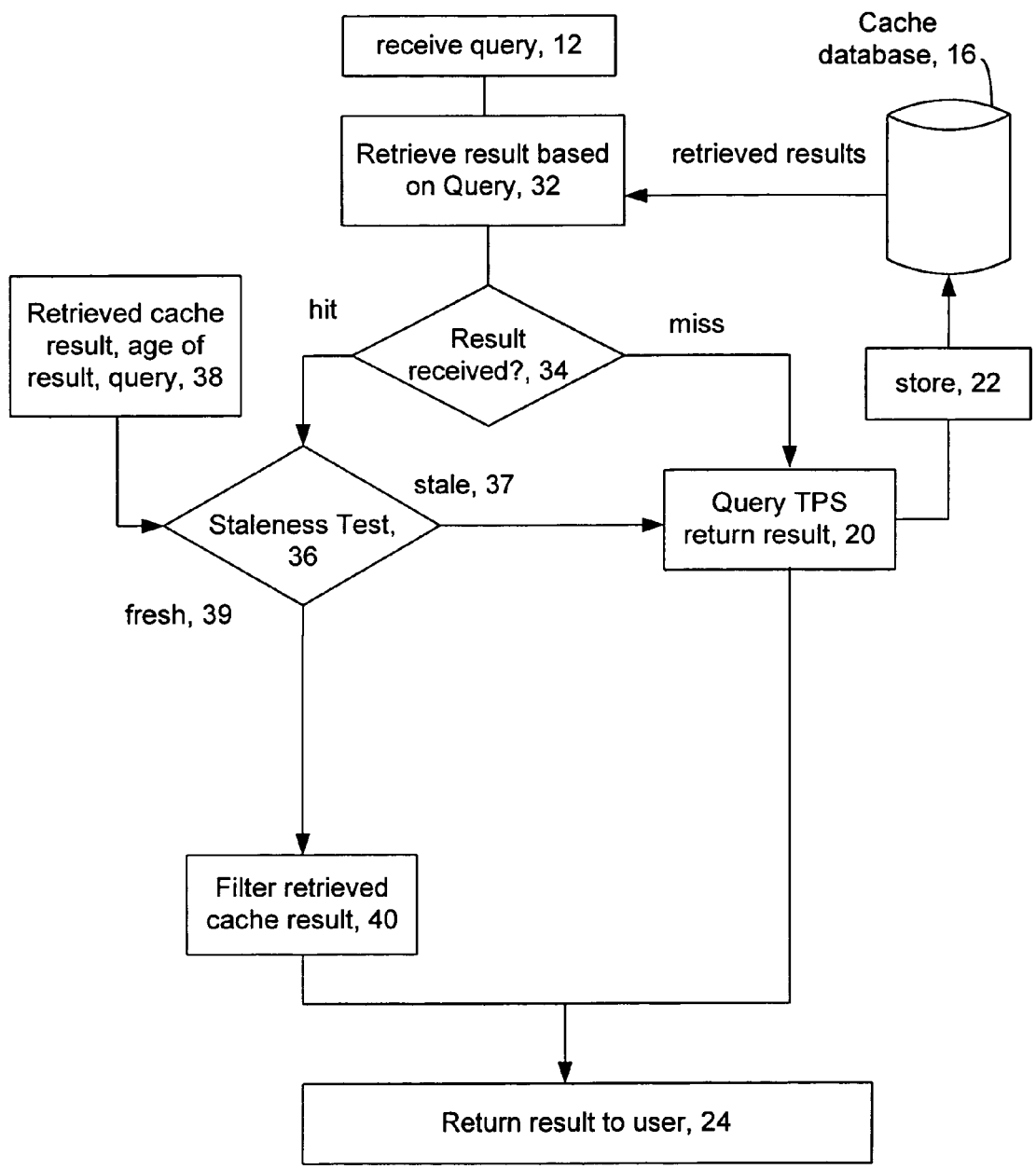
FIG. 2 is a flow chart of a cache test.

An optional implementation of query caching shown in FIG. 2, allows for cached answers to be sent to a filter 40 to be filtered or otherwise modified prior to being returned to the querier. In such an implementation of query caching if the cache query result is found in the cache database 16, (a cache hit), and the result is determined to be fresh (i.e., not sufficiently stale to warrant posing a new query to the TPS), the result is sent to the cache filter 40. The cache test and filter 40 may be a sophisticated process that filters stale answers or replaces stale answers with fresh ones. Alternatively, the staleness test 36 can be eliminated and the cache can return the cached answer, or return a filtered version of the cached answer regardless, without the alternative of performing a search if it is stale.

Figure 3:
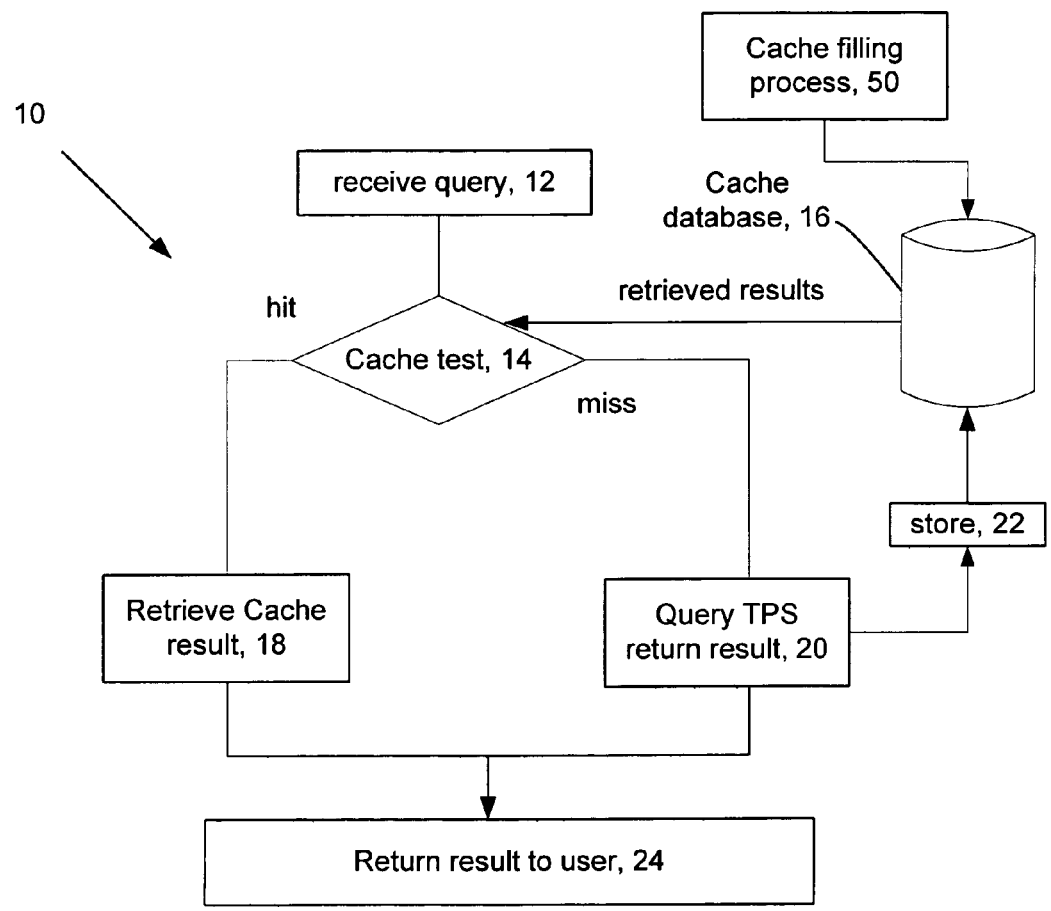
FIG. 3 is a flow chart of a query cache process with pre-emptive cache fill.

Referring to FIG. 3, a cache filling process 50 can independently update the cache database 16, either prior to or concurrently with the use of the caching arrangement 10. The cache can be preemptively filled by filling process 50 to increase the likelihood of cache hits. If a TPS preemptively fills a cache then a greater proportion of queries may hit the cache, further reducing average query latency at the potential expense of unnecessarily computing answers for queries that may never be posed.

Query caching for TPSes can reduce the total computational resources expended by a TPS over an extended set of queries by eliminating duplicate work and reduce the latency of queries that hit the cache, since for such queries the process of retrieving the result from the cache is substantially quicker than that of having the TPS re-execute the query. LFS query caching is especially, valuable when LFS queries are used as part of more general travel planning applications, such as flexible-date queries, flexible-destination queries, and fare monitoring and alerting applications, since in many cases these applications perform many duplicate or similar LFS queries.

Take as an example a fare monitoring and alerting application that on a regular schedule (perhaps daily) performs LFS queries on behalf of multiple users in markets specified by those users, alerting each user if prices in his or her markets have dropped or are particularly low. Such an application may pose the same queries many times over an extended period, both because different users may specify the same markets, and because the same queries are re-posed regularly (daily) to keep abreast of changes to prices, flights and seat availability.

The effectiveness of query caching depends on the proportion of duplicate queries posed to a TPS, since query caching is a technique for reducing the computational expense of duplicate queries and does not improve queries that are only posed once. Several factors influence the proportion of duplicate queries posed to a TPS, including the number of possible queries, the skew in query distribution, and details of user or application behavior.

For many applications of travel planning, a large amount of data is included in the travel queries. For example, air travel web sites typically submit travel planning queries that include for a round-trip LFS generally at least: one or more origin airports or cities; one or more destination airports or cities; an outbound departure date, or set of dates; a return departure date, or set of dates; number of different types of passengers (e.g., adult, child, infant, etc).

For travel within North America there are more than 200 airports with substantial numbers of flights; assuming travel planning is done no more than 330 days in advance with layovers of 2 months or less, then not even considering passenger variation or flexible sets of airports or dates, there are more than 200*200*330*60=792,000,000 possible queries, far more than would ever be received by a TPS before flight, price and seat availability changes cause cached results to become stale.

However, the distribution of travel queries from the query space is normally heavily skewed. Since many airports are very small, within North America fewer than 10,000 location pairs account for a vast majority of queries, and in some situations, such as use of a TPS by a travel agent that targets a small number of markets, the skew is even greater. As an example, a travel agent that caters to cruises may pose only queries with a very small set of coastal destinations and reservation agents for a small airline may only pose queries for the small subset of airports that the airline flies to. Furthermore, travel dates tend to concentrate in the immediate future: the majority of queries are posed for travel within a month or two of query time, and most trip durations are less than two weeks. Additionally, LFS queries tend to involve a small number of passenger configurations, such as one adult, or two adults, or two adults and a child.

Some special applications of LFS queries further reduce the size of the query space. For example, so-called "calendar" or "flexible date" queries may have fewer possible date specifications ("a weekend in a specified month", i.e., 12 date possibilities, or "a week-long trip starting on specified date", i.e., 330 date possibilities). So-called "anywhere" or "flexible destination" queries may have fewer possible destination specifications.

In situations where the query space is small enough, or sufficiently skewed, there is a substantial likelihood that two or more similar or identical queries will be posed in a short time period (before the data used to answer the query has materially changed), and query caching can be used to reduce computational load and latency.

A second factor contributes to the proportion of repeated queries. Many users of TPSes pose the same query multiple times, often over a short period. For example, a vacationer may pose the same exploratory query every day to find out whether prices to their favorite destinations have changed. Or a web-site user moving between web pages may find it necessary to re-pose a query after the original result has been lost; many travel web sites also "time out" sessions after short periods, forcing a user who has paused to repose a query prior to purchasing a ticket. Also, as mentioned previously, some applications like fare alerting and monitoring repose the same queries regularly.

Figure 4:
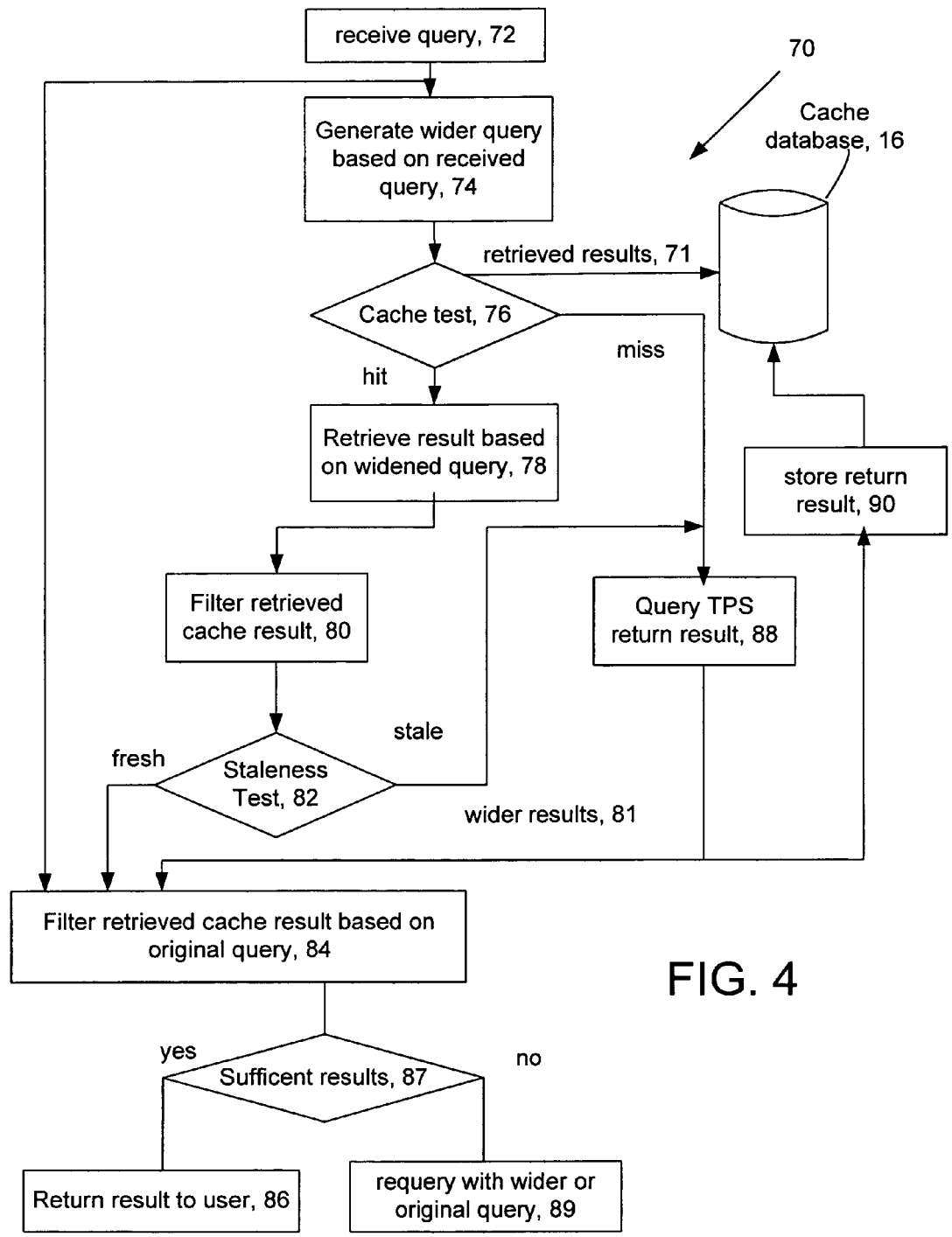
FIG. 4 is a flow chart depicting query-caching widening

Referring to FIG. 4, a query widening process 70 is shown. If the space of possible travel queries is very large, and if queries include fine details (such as desired hours of travel, or traveler ages) then it is less likely the same query will be replicated. Query widening process 70 is a technique for preventing overly fine queries from causing cache misses. Query widening process 70 can be used to eliminate travel restrictions in searching the query cache 16 to improve the rate of cache hits. A query is received 72 from the travel planning system. The query widening process 70 generates 74 a wider query from the original query. The wider query is used by a cache test process 76 to determine whether a valid result for the query is stored in the cache database 16. If a valid result exists, the result of the wider query is retrieved, 78 and sent to a result filter to filter 80 the result. The filtered result can be sent to a staleness test 82. The filter can be any of the techniques described below such as statistical or age tests, direct tests, re-query tests, re-query with updating, and so forth. If the results are fresh, the fresh results are sent to a filter that filters 84 the results based on the original query, by eliminating answers that do not meet the original query's restrictions, producing 82 a final result that is returned to the user 86.

If the cache test 76 fails to find a valid cached result, the wide query 71 is sent to the travel planning system to produce 88 a wide result, which is stored 90 in the cache database 16, indexed by the wide query 71. The wide result 81 is also sent to the result filter 84, which uses the original query 12 to produce the final result.

Additional, the possibility can exist that after filtering 84 an insufficient number of answers remain 87 based on the original query. In this situation, either the original query or the wide query could be sent 89 to the TPS. For instance, it might be that the cached result, especially after filtering of stale results, does not contain enough answers that satisfy the original query. Otherwise if sufficient answers remain the answers are returned 86 to the user.

For example, if a travel query is posed that imposes departure time restrictions finer than whole days (e.g., depart June 23rd 9 am to 11 am), then a wider whole-day query is posed (depart June 23rd any time), preferably in a form that causes answers to be returned for every hour of day. The wider query's result is cached. The result is filtered to extract answers for the restricted time range, and this filtered result is returned to the querier. Subsequent queries for the same departure date, with or without time restrictions, will hit the cache entry, which is filtered as appropriate for the subsequent queries.

Query widening is not restricted to eliminating time restrictions but can similarly be used to eliminate airport restrictions (for example, by always considering all airports within a city), airline restrictions (by always searching over all airlines), and number-of-stop and cabin-class restrictions, among others.

Forms of query widening can also be used for passenger specifications. For example, query widening can replace the passenger information in the original query so that the wide query specifies a default mixture of passengers (1 adult, 1 infant, 1, child and 1 senior citizen, for example). Then the wide result will contain prices for each common passenger type, which can be added as appropriate to construct prices for whatever passenger distribution was in the original query. Some care may be necessary to handle details associated with prices that depend on knowing all the passengers at once, such as so-called companion fares; one way to deal with such cases is to prohibit the wide query from using companion fares.

As an example, suppose a one-way query is received: original query:
FROM: John F. Kennedy (JFK) airport
TO: Minneapolis (MSP)
DEPARTURE TIMES: June 13th, 6 am to noon
PASSENGERS: 2 seniors
OTHER: nonstop only
OF ANSWERS: 1

The query widener may generate the following wide query, still sufficiently narrow to be solvable by a normal TPS:
wide query:
FROM: New York City (JFK, LGA or EWR airports)
TO: Minneapolis (MSP)
DEPARTURE TIMES: June 13th anytime
PASSENGERS: 1 adult, 1 senior, 1 child
OTHER: none
OF ANSWERS: 100

In the wide query the "from" airport has been expanded into a set of several airports, the departure time has been widened to a whole day, the passenger set has been replaced with a default set of passengers, the non-stop restriction has been eliminated, and the number of answers has been increased to allow for the wider query and the possibility that future queries might request more answers.

The TPS returns results for this wider query that are both applicable and inapplicable to the original query:
1. LGA→MSP, June 13th 10 pm, 1 stop, $100/adult, $90/senior, $50/child
2. EWR→MSP, June 13th 5 pm, 0 stop, $200/adult, $100/senior, $80/child
3. JFK→MSP, June 13th 8 am, 0 stop, $150/adult, $100/senior, $75/child
4. JFK→MSP, June 13th 11 am, 0 stop, $300/adult, $180/senior, $90/child The result filter 84 filters the wide result to obtain only answers that match original query's restrictions (answers 3 and 4, in this case). It re-calculates prices to reflect the original query's passenger distribution, and returns the number of answers originally requested:
3. JFK→MSP, June 13th 8 am, 0 stop, $100/senior*2=$200

With the query widening subsequent similar but non-identical queries will also hit the cache, such as a query from LGA to MSP on the same date for 1 adult. The effectiveness of query widening depends heavily on the properties of the TPS. Some TPSes share common work when processing wide time ranges, multiple passengers, or multiple origin or destination airports. Such TPSes therefore expend substantially fewer resources answering one wide query than many narrow queries. For such TPSes the greatly improved cache hit rate that results from query widening is worth the slight increase in computation widening causes for the queries that miss the cache. If a TPS is capable of efficiently answering very wide queries (such as queries over many days, or many origins or destinations) it may be desirable to choose very coarse granularities when widening, such as single queries over many months of possible departure dates, or over an entire country of possible destination airports.

Travel planning systems typically search over a dynamic database of schedules (flight, bus, boat, train), fares (prices) and seat availability, hereafter referred to as the "travel database". The travel database changes rapidly as schedules and prices are modified and seats sold. But typically only a small portion of the travel database changes over any short time period. For example, while seats on flights are sold many times a second, the availability of a particular seat type (booking code) on a particular flight may only change once or twice over a many-month period. Since the response to a travel-planning query depends on the ever-changing travel database, cached answers become stale. The correctness of a cached result for a particular query depends on whether the particular flights, fares and seats that affect that result have changed.

One component of a query caching system is a process for determining or estimating when a cached result is stale, and needs to be re-computed. There are several possible mechanisms for testing staleness.

One technique is to make estimations based on the query and the age of the cached result, and potentially other aspects of the query result, but without explicitly checking for staleness by comparing the query or response to the travel database. For example, experiments can be done off-line to build a statistical table of how frequently cached results of a certain age are incorrect, and this table can be used to determine whether to re-compute a query (using a threshold on the probability).

Another, generally more reliable method, for determining whether a cached result is stale is to compare the cached result to the travel database at the time of the subsequent query. In general there can be two parts to such a test: testing whether the answers in the cached result are valid answers at the time of the subsequent query, and testing whether any other answers might now be better than those in the cached result.

When a TPS answers an LFS query it typically examines a very large number of flights, fares and seats in its travel database, but the answers it produces (typically several of the cheapest or most convenient, or a small diverse set of attractive answers) usually contain only a small set of flights, fare and seats. In the extreme case where a TPS returns only one (best) answer for an LFS query, the result may only contain two or three flights and fares even though the TPS examined many thousands or tens of thousands during its search. Thus even if a cached result is old there is a substantial chance that all of the small number of travel database elements used in the result's answers remain valid.

One method for determining whether a cached result is valid is a direct test. In the direct test technique the results are crosschecked with the travel database. A direct test technique includes recording with the cached result information identifying all the travel database elements used in the result's answers (the flights, fares, fare rules, seat availability and any other critical elements). Upon receipt of a subsequent cached query the travel database is searched to determine whether all of the database elements contained in the cached result remain unchanged in the current database. If so, then the result's answers remain valid, and if not the proportion of invalid answers can be estimated and used to decide whether to re-compute the query result. For example, if too few answers remain, or too many of the better answers have been filtered, then it may be better to perform a new query than to return the (filtered or unfiltered) cached result. Alternatively, if sufficiently few answers are invalid, they can be filtered from the result and the remainder returned to the querier.

Figure 5:
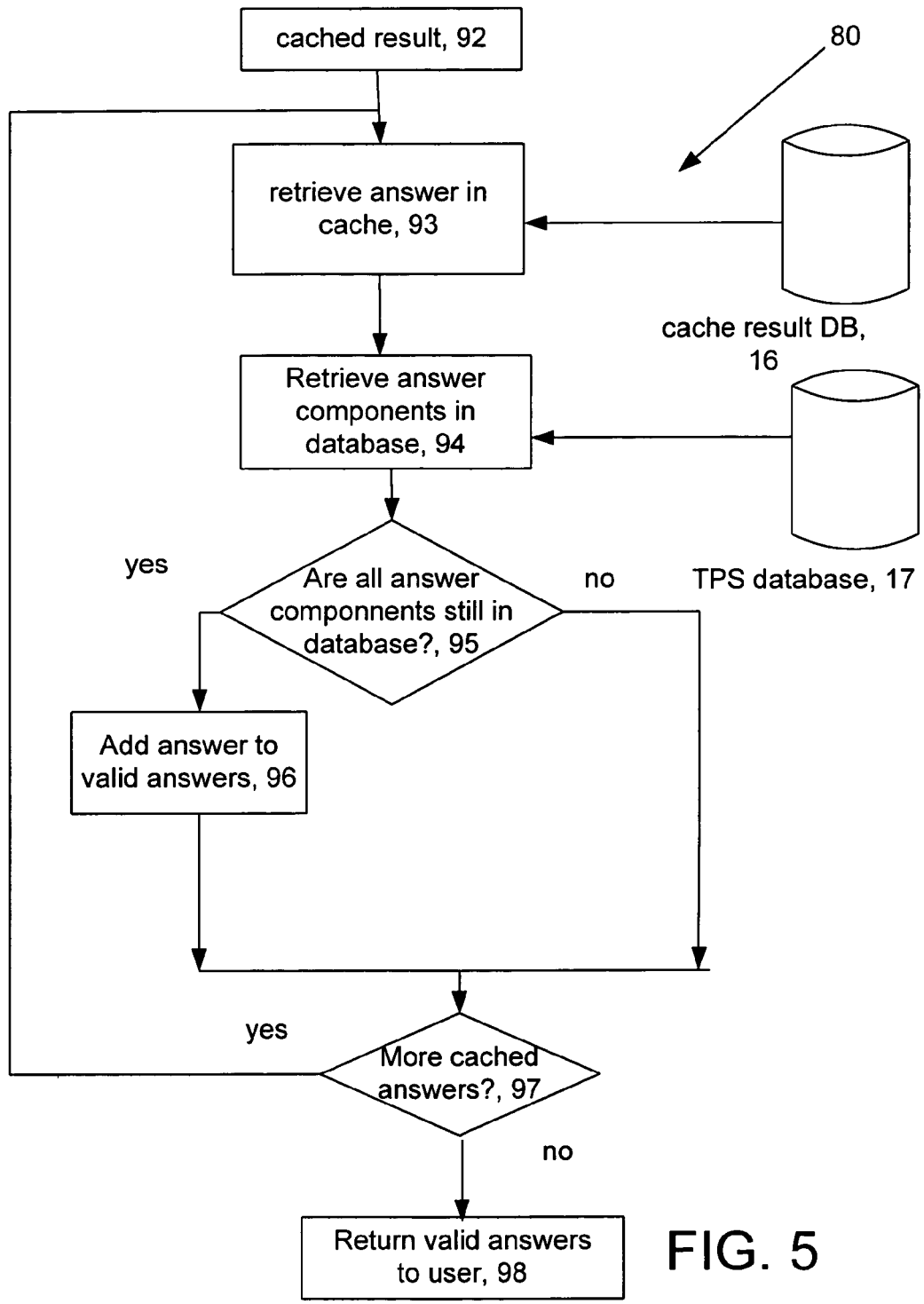
FIG. 5 is a flow chart depicting a direct test filter process.

Referring to FIG. 5, the direct testing can be implemented in the cached answer filter 76 (FIG. 4). The cached result is passed 92 to the direct test filter 100, which filters the answers of the cached result using a direct test. Direct testing will retrieve 93 the answer in the cache database 16 and retrieves answer components 94 from a travel database 17 associated with a TPS. The direct test verifies 95 that all components of the answer (the flights, fares, seats, fare rules, etc) that came from the travel database 17 remain in the cache database 16, so that the cached answer is considered to be valid. If valid, the answer is added 96 to a list of valid answers, otherwise, the process 100 loops 97 for all answers in the cache. The set of valid answers from the cached result are passed 98 on to the user.

A representative staleness test for use with direct testing may take into account the proportion or quality of answers that have been filtered. The staleness test considers a cached result to be stale if the result is too old, if too many answers have been filtered (an indirect indication that the result is too old), or if too few valid answers remain to satisfy the original query.

Standard statistical sampling techniques may be used so that not all answers from the cached result are tested to determine whether the result is stale; for example a random subset of the answers may be tested and if more than a certain proportion fail the result is considered stale.

Figure 6:
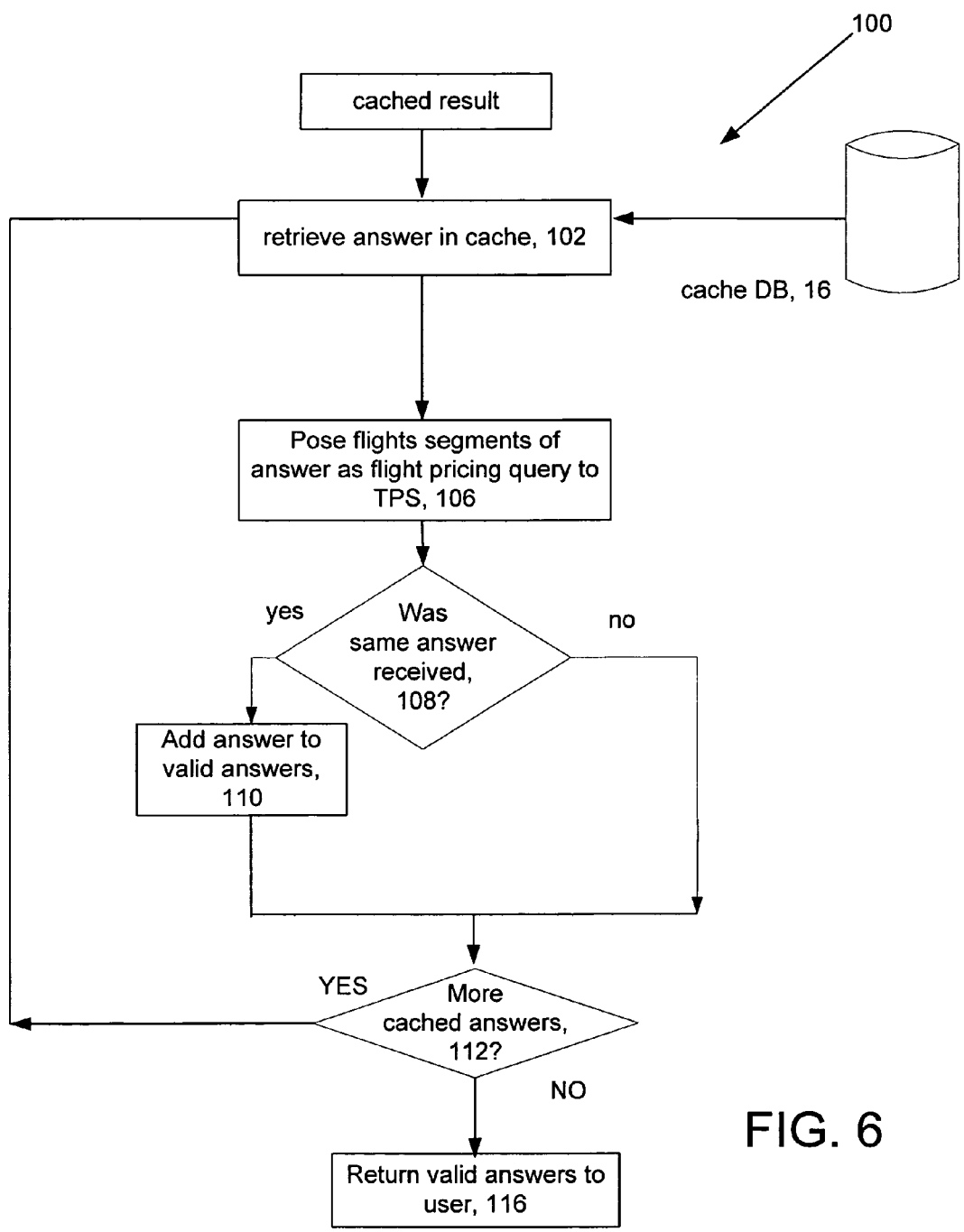
FIG. 6 is a flow chart depicting a re-query test filter process.

Referring to FIG. 6, a second technique for determining whether a cached result is invalid is a re-query test filter 100. The re-query filter 100 retrieves 102 the answer in the cache. The re-query test filter 100 poses 106 new queries to the TPS based upon the answers returned from the cached result. For example, for each answer in the cached result of an LFS query the flights in that answer can be used to pose so-called "pricing" or "flight pricing" queries to the TPS. Flight pricing queries find the best price for a specified flight combination. If the TPS indicates that the queried flights no longer exist, or returns a price for the flights that differs from the cached answer, 108 then the cached answer is no longer valid. Although posing flight pricing queries imposes some computational burden on the TPS, in common cases where LFS results contain only a small number of answers, a TPS may be able to answer flight pricing queries for each answer in the cached result much faster than it could re-calculate the result itself (which requires searching over many flight possibilities beyond those in the cached result). If valid, the answer is added 110 to a list of valid answers, otherwise, the process 80 loops 112 for all answers in the cache. The set of valid answers from the cached result are passed 116 on to the user. Additionally, the process 87 can determine if there are a sufficient number of valid answers and if not re-query using the original or a widened query as in FIG. 4.

A re-query test filter 100 is similar to the direct test filter of FIG. 5 except that the test of whether an answer is invalid is performed by posing queries 102 to a TPS based on key information from the cached answer (in this case, flight pricing queries based on the flights of the cached answer).

If LFS results include many answers it may be inefficient to pose re-query tests for all answers. However the re-query test filter 100 can be modified to test only a subset of all cached answers and thus provide a statistical estimate of the number of answers that are valid. This estimate can be used in the staleness test to estimate whether the result as a whole is stale and should be re-computed.

One advantage of re-query testing over direct testing is that there is no need to record in the cached result all the travel database elements that contributed to the result. For example, it may only be necessary to store the flight information necessary to support flight pricing queries, as opposed to storing flights, fares, fare rules, and seat availability, as would be necessary for direct tests. This is especially important if the correctness of an answer depends on travel database elements that are not normally considered part of the answer. For example, the so-called "IATA checks" (International Air Travel Association) such as "HIP checks." HIP (Higher Intermediate Point) checks are a ticket restriction mandated by airlines for international travel, that prevents one from using a fare published between two terminal points of travel if there is an intermediate point of travel without first checking if the airline publishes a "comparable" fare at a higher price between the intermediate point and one of the terminal points of the trip. With re-query testing if a HIP check applies it may not be possible to determine the validity of a ticket having an origin A intermediate stop B and destination C using an price between A-C without checking comparable fares that don't appear on the ticket. These HIP checks can render direct tests inadmissible (not guaranteed to be correct) unless all the comparable fares are checked by the direct tests, which may be impractical or inefficient if the set of comparable fares is large. Re-query testing does not suffer from this problem.

Figure 7:
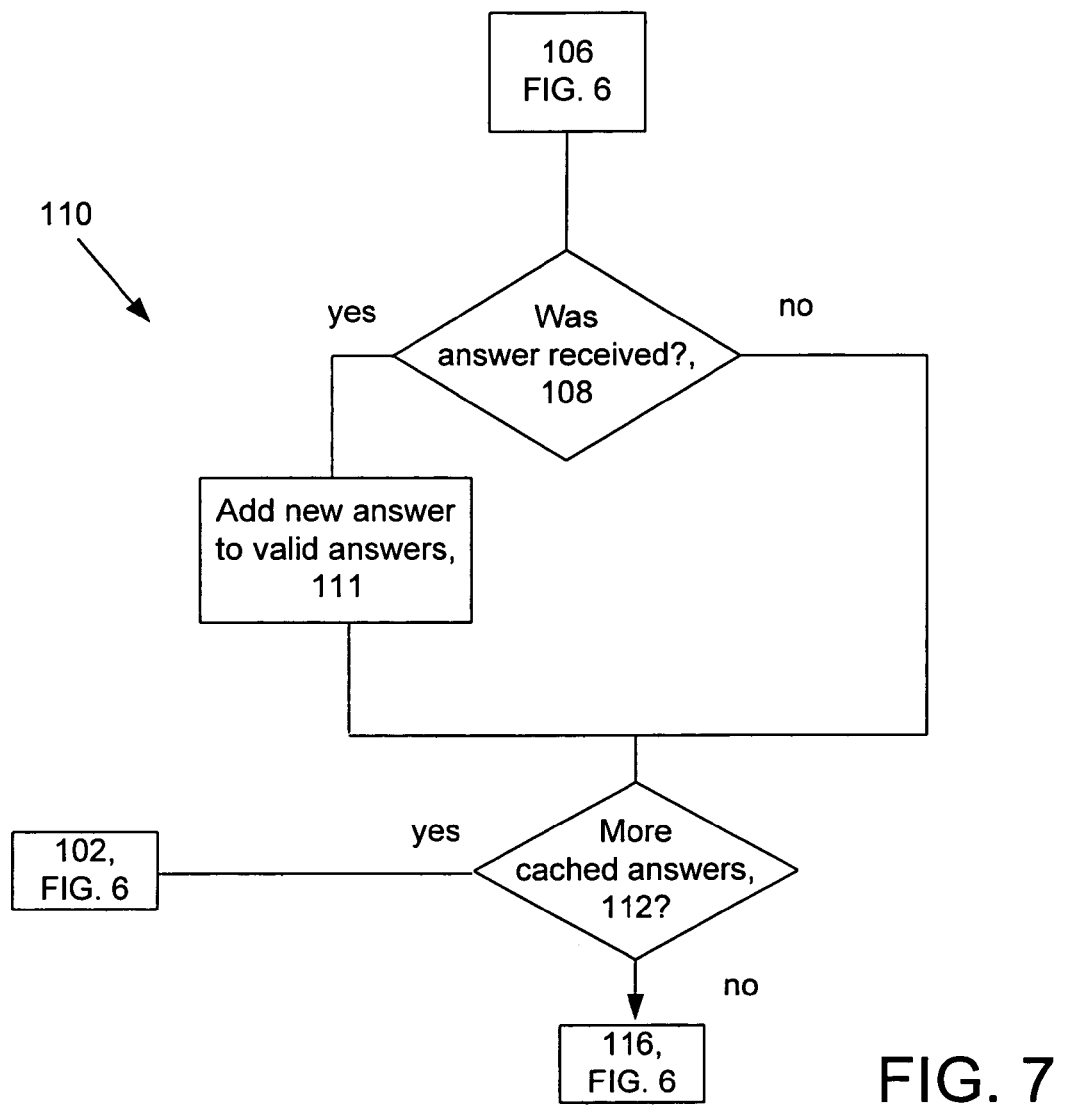
FIG. 7 is a flow chart depicting a re-query test filter with updating process.

Referring to FIG. 7, a second type 100a of re-query testing produces valid answers even when the cached answers are invalid. When the cached answers are re-queried (e.g., by posing flight pricing queries), so long as those aspects of the cached answers that are part of the re-query (the flights) remain valid, 108 the re-query should produce a valid answer. If the new answer is different than the cached answer (the price for those flights has changed) then the cached answer is invalid, but the new answer can be substituted 111 in its place. FIG. 7 depicts a relationship to referenced elements 102, 106 and 116 of FIG. 6.

For example, suppose the travel database includes the following flights and fares at the time of a Boston to Los Angeles (BOS→LAX) LFS query:

Flight: UA 123 BOS-LAX (departing 6 am)
Flight: UA 456 BOS-LAX (departing 9 am)
Fare: UA "Y" BOS-LAX $800 (good anytime)
Fare: UA "Q" BOS-LAX $400 (good on afternoon flights)
Suppose the result to this query is the answer
Flight: UA 123 BOS-LAX,
Fare: UA "Y" BOS-LAX $800 which is cached. Suppose that between this (original) query and a subsequent identical query the flights and fares change such that the new travel database is:

Flight: UA 123 BOS-LAX (departing 6 am)
Flight: UA 456 BOS-LAX (departing 1 pm)
Fare: UA "F" BOS-LAX $900 (good anytime)
Fare: UA "Q" BOS-LAX $400 (good on afternoon flights)

A direct test of the cached answer would determine that the cached answer is invalid (since the original "Y" fare no longer exists). In contrast, a re-query test that re-posed the cached answer's flights as a flight-pricing query would generate a new answer:

Flight: UA 123 BOS-LAX, Fare: UA "F" BOS-LAX $900

Since this answer is different than the original answer, the original answer is invalid. However the new answer can be substituted 111 in its place and returned to the querier. Since flights tend to change less frequently than fares or seat availability, it is likely that almost all of the original answers will result in new answers (even if they have different fares and prices than the original answers), so a response can be constructed from the re-query answers. Since flight-pricing queries are typically fast compared with LFS queries, this can substantially reduce computational load. However there is a risk that other different flights not found in the cached answer might have produced better answers at the time of the subsequent query.

Other similar forms of re-querying that are based on aspects of the original query other than flight information are possible. For example, at the time of a subsequent query, cached answers can be used to produce a list of routes (airport sequences, or airport and airline sequences). If a travel planning system supports LFS queries constrained by route restrictions then these routes derived from the cached answers can be used to pose constrained LFS queries, just as flights can be used to pose flight pricing queries. A TPS may be able to execute LFS queries constrained to particular routes much faster than a full (unconstrained) LFS. The answers to the constrained LFS queries can be collected to generate the response to the subsequent query. When re-query tests are used with updating, so that answers from the cached result are not directly included in the final result (only answers to re-queries make their way in to the final result), it is not necessary to store full answers in the cache. The cache only needs to contain whatever information is necessary to generate the re-queries, such as flight combinations or routes.

Figure 8:
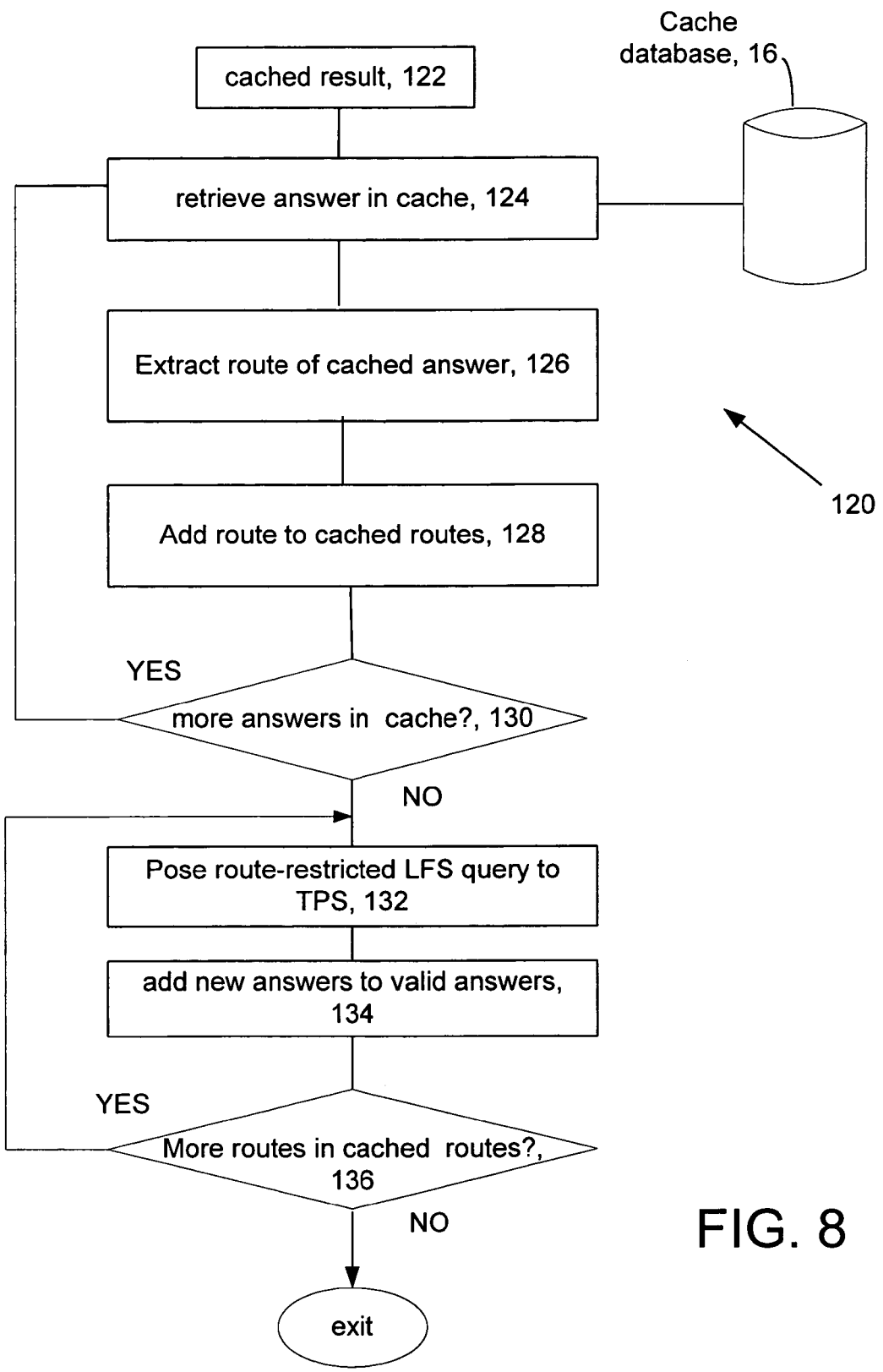
FIG. 8 is a flow chart depicting a re-query test filter with restrictive LFS queries.

Referring to FIG. 8, a modified re-query process 120 based on restricted LFS queries is shown. In effect the re-query process 120 uses the flights of the cached results to avoid performing a full LFS. Re-query process 120 receives a cached result 122 and retrieves 124 answers from the cache database 16. The process 120 extracts 126 routes from cached answers, and adds 128 routes to a cached routes list. If there are more answers in the cache 130 the process 120 retrieves 124 the next answer, otherwise the procedure will pose 132 restrictive LFS queries to a TPS based on routes in the cached routes list. The process 120 adds 134 new answers to a valid answers file and tests 136 if there are more routes in the cached routes file. If there are not more routes, the procedure can exit.

The validity of an answer may be directly dependent on the time the query was posed. For example, in air travel planning it is common for fares to have so-called "advance purchase" restrictions that restrict the purchase time of tickets. Since travel-planning systems typically use the query time as a substitute for the purchase time in advance purchase calculations, the validity of a query result is directly dependent on the query time. In effect, the query time is an implicit part of the query.

It could be problematic to include the query time in tests of query identity, since it would render all queries unique and thus would prevent caching. When direct testing, one way around this problem is for the TPS to compute for each answer the latest query time for which the answer remains valid. This information is typically provided by air-travel TPS's so as to warn users when a ticket must be purchased by. If the latest valid query time for each answer is stored in the cached result (or re-computed from the cached answer), then upon the receipt of a subsequent query, this time can be used to test the validity of individual answers in the cached result, by comparison to the time the subsequent query is received. Re-query testing essentially eliminates this problem, since restrictions based on query time will be re-checked as part of the re-posed queries.

It is usually desirable for a TPS to return the best possible answers for an LFS. Testing whether cached answers are the optimal (best) answers for an LFS is a different, and generally harder, matter than testing whether they are valid (correct) answers. To ensure that a cached answer remains optimal it is necessary to ensure that changes to the travel database have not caused other, better, answers to come into existence. Returning to the example above, a change to the departure time of flight UA 456 opens up a new answer, Flight: UA 456 BOS-LAX, Fare: UA "Q" BOS-LAX $400 that is cheaper than either the cached answer or the answer that results from re-querying the original answer's flights (flight UA 123). While it would be correct to return the answer that is generated by re-querying the cached answer's flights, it is more desirable to recognize that the cached result is stale and re-compute the LFS, since it will result in a cheaper answer.

There are several methods that can be used to test or estimate whether a cached result's answers remain the best.

Just as statistical techniques can be used to estimate whether cached answers are likely to be invalid, statistical techniques can be used to estimate whether better answers are likely to exist. Again, possibilities range from pre-building probability tables based on the age of the cached result to more sophisticated techniques that take into account properties of the query or results.

It is possible to separate the estimation of validity from the estimations of whether better answers exist. For example, statistical estimation techniques can be used to determine whether a full LFS needs to be performed because better answers are likely to exist, and if this test indicates that a full LFS is not necessary, then direct or re-query testing can be performed on the cached result to eliminate invalid answers.

In certain restricted cases it may be possible to perform direct tests that cached answers remain optimal. For example, if no part of the travel database has changed and all cached answers are valid, then presumably they remain optimal. More useful but less reliable direct tests can be performed by checking a smaller set of database elements defined by the LFS query and the cached result. For example, for an LFS query from airport A to airport B with a cached result with cheapest price $100, one could test whether:

1) any new direct flights have been added from A to B; or
2) any new seats have become available on direct flights from A to B; or
3) any new fares from A to B with price less than $100 have been added.

If any of these conditions is true, it would serve as a good indicator that a better answer could exist than that found in the cached result. However it is not a perfect test in that even if the test fails, a better answer might have come into existence through the discovery of two less expensive fares, A to C for $30 and C to B for $50, that collectively are cheaper than the cached A to B $100 price.

A third manner for testing optimality of cached results is to perform a "shallow" but quick query and compare its answers with the cached result. Typically travel-planning systems permit some control over the trade-off between search time and search quality, especially for LFS queries. When caching queries it is not advantageous to perform a full LFS for every query, as this would defeat the purpose of caching. But it may be possible for a TPS to perform a shallower LFS at substantially smaller computational expense than a normal LFS, and have reasonably high confidence that if the result is not better than the cached result, then the cached result is probably still optimal. This is because for most LFS queries the best answers are simple and can be found by a shallow restricted LFS that might, for example, only consider a smaller number of flight possibilities than a normal LFS.

In the following discussion it is assumed that the TPS supports a controlled tradeoff between search quality, as measured by the probability of finding the cheapest answer and computation time. For example, the querier is able to query for a shallow (and quick) search that on average consumes 2 seconds of time but is less likely to find the cheapest answer, or a "full" (or "deep") search that on average consumes 10 seconds of time and is nearly certain to find the cheapest answer.

To illustrate, suppose that 80% of the time the best answer for an LFS can be found by a quick, "shallow" search that consumes 2 seconds, and 20% of the time the best answer can only be found by a full LFS that takes 10 seconds. Further suppose that 60% of the time the value of the best answer for a (cached) query is the same as the value of the best answer at the time of a subsequent query, but that 20% of the time the best value increases, and 20% of the time it decreases. Further assume these two processes are independent: the efficacy of shallow LFSes is not affected by whether prices have recently risen or dropped. Finally suppose that when the best values stay the same, there is at least 75% chance than at least one best answer from the cached result remains valid at the time of the subsequent query.

Suppose that values for answers are defined so that lower is better (as when value is defined by price). Adopting the following notation, if $C$=value of the best answer at time of cached query $S$=value of the best answer at time of subsequent query $Q$=value of the best answer found by shallow LFS performed at time of subsequent query (thus $S<=Q$)

then the following contingency table depicts the possible relationships between C, S and Q along with their probabilities. The vertical axis depicts the relationship between Q and C, the two quantities that would be accessible to a caching system that performed a shallow LFS upon receipt of a cached query. The horizontal axis is headed by the relationship between S and C (i.e., whether prices have risen or dropped between queries). The final column, $p(S=Q)$, is the probability that the shallow LFS returns the best answer.

TABLE 1

| | | S < C 20% | | S = C 60% | | S > C 20% | | |
|---|---|---|---|---|---|---|---|---|
| | 16% | 4% | 48% | 12% | 16% | 4% | p(S = Q) |
| Q < C 16-20% | S = Q < C | S < Q < C | | | | | | >=75% |
| Q = C 48-52% | | | S < Q = C | S = Q = C | | | | >=92% |
| Q > C 32-36% | | | | S < C < Q | S = C < Q | C < S = Q | C < S < Q | <=50% |

While it is assumed that $p(S=Q)$ is 80% in general, when $Q>C$ (when the shallow search returns a value worse than the cached result) the probability that the shallow result found the best answer is much lower, i.e., less than or equal to 50%. This suggests that it may be desirable to perform a full LFS in that circumstance.

Suppose that upon subsequent receipt of a cached query the caching system performs a shallow LFS, and takes one of two actions depending on the relationship between Q and C:

Action 1. performs a full LFS and return the result

Action 2. use a direct or re-query or re-query-with-updating filter to filter invalid answers from the cached result; merge the result with the results of the shallow search, and return the merged combination.

Action 1 consumes an additional 10 seconds but guarantees the correct answer. Action 2 is assumed to require insignificant computational resources, but it is not guaranteed to find the best answer (it is however guaranteed never to return invalid answers). Action 2 fails to find the best answer when S<C (the best value has improved) and S<Q (the shallow LFS fails to find the best value), and by our assumptions also fails 25% of the time when S=C<Q, that is when the best price remains constant but the shallow LFS fails to find it and the particular best answers found in the cache are no longer valid.

The following Table 2 summarizes several strategies for choosing Action 1 or Action 2 based on the relationship between Q and C. The Q<C, Q=C, and Q>C columns specify the action taken by a strategy in each circumstance. The "Ave. Time" column contains the average computation time taken by the strategy, and the "Probability of finding best" column contains the probability of finding the best answer.

TABLE 2

|  | Q < C | Q = C | Q > C | Ave. Time | Probability of finding best |
|---|---|---|---|---|---|
| No caching full |  |  |  | =10.0 | =1.0 |
| No caching shallow |  |  |  | =2.0 | =.8 |
| Strategy A: | Action 2 | Action 2 | Action 2 | =2.0 | =.89 |
| Strategy B: | Action 2 | Action 2 | Action 1 | ~5.4 | >=.96 |
| Strategy C: | Action 1 | Action 2 | Action 1 | ~7.0 | >=.96 |

All strategies find the best answer when S=Q (when the shallow LFS finds the best answer, by our assumptions 80% of the time). In addition strategy A finds the best answer 75% of the 12% of the time when S=C<Q, for a total probability of finding the best of 0.89, substantially better than the 80% that would come from shallow searches alone, and with no significant extra computation. Strategy B finds the best answer when S=Q or when Q>C, for a total probability of at least 96%, but since it performs full LFSes when Q>C, the expected amount of computation goes up to about 5.4 seconds. Strategy C finds the best answer in all cases except the rare situation where S<Q=C (the price has dropped but the shallow search does not find the better price), but performs full LFSes in even more circumstances. The relative desirability of strategies A, B and C depends on the particular manner in which prices evolve and the effectiveness of shallow searches.

From this example it is clear that there are many benefits to performing a quick, shallow LFS and then either merging the answers with the (filtered) cached result or using the shallow result to decide when to perform a full LFS. Even if strategy A is used, in which no additional full LFS is performed, results are better than doing shallow LFSes with no caching, because the cached result of a full LFS is merged with the shallow results. With strategy B the best answer is almost always found because a full LFS is performed when it is most likely that the shallow LFS was incorrect (when Q>C), but the total computation performed is still substantially less than the no-caching solution of always performing full LFSes.

If re-querying is used to filter the cached result, then the probability of finding the best answer is increased beyond that depicted above, since the re-queried cached results can be better than the original cached results (because of fare reductions, for example) and will be merged with the shallow LFS answers. Put another way, some of the cases where S<C<Q will be found.

Figure 9:
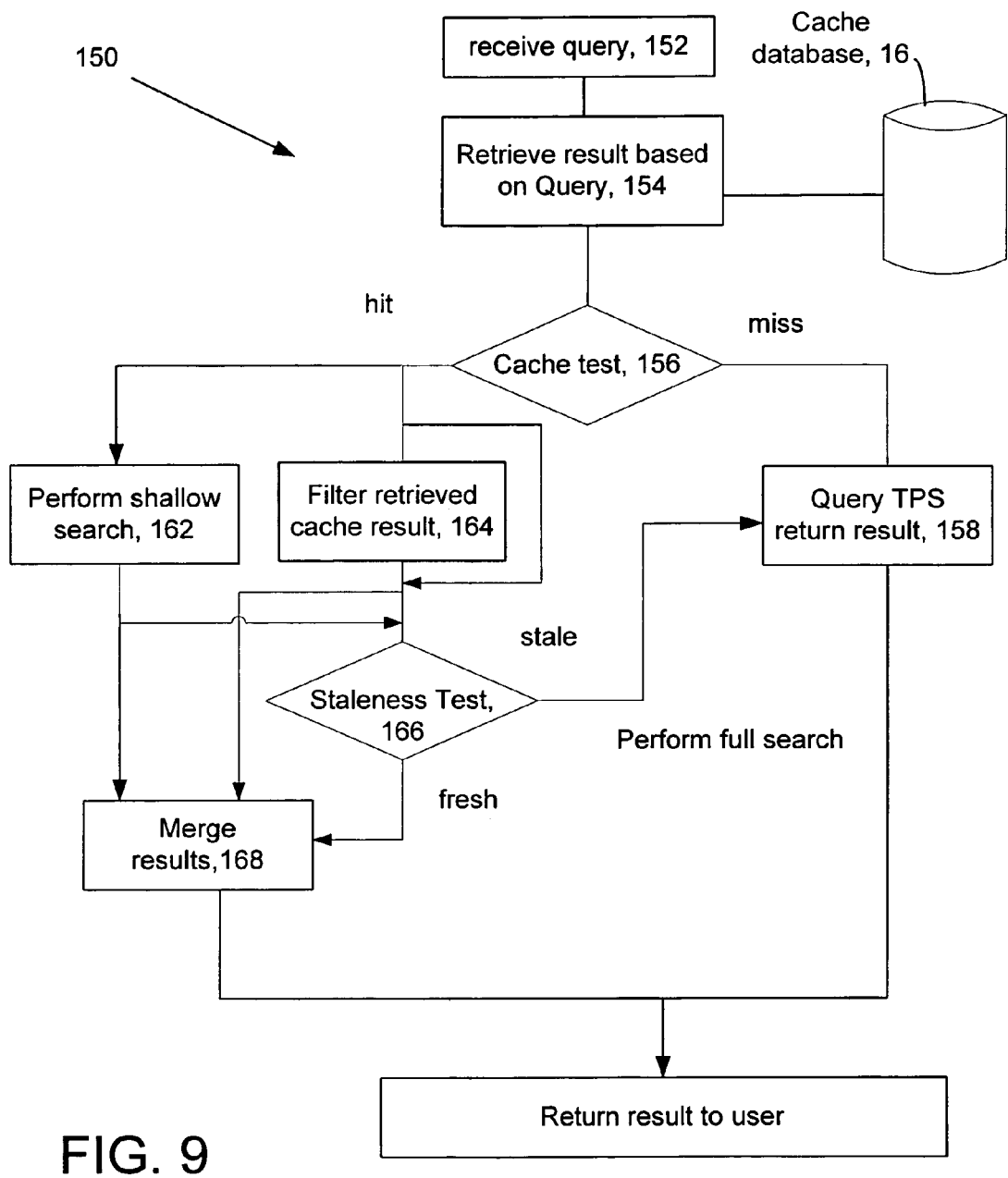
FIG. 9 is a flow chart depicting a shallow search with merging.

Referring to FIG. 9 an implementation of shallow search 150 with merging is shown. The query is received 152 and results are retrieved 154 from the cache database 16. The cache is tested 156. If a cache miss occurred (no entry is found) then as in FIG. 1, a full search is performed and cached 158. If a cache hit occurs a quicker shallow search is performed by a shallow search process 162 that modifies the query as appropriate for a shallow search and sends it to the travel planning system, producing a valid search result that may or may not include the best answers. The cached result is passed through any type of cached answer filter 164, but preferably a re-query filter with updating, as depicted in FIG. 7. Passing through the filter 164 produces a filtered (and possibly updated) result. The shallow search result, cached result and filtered result are directed to a staleness test 166 to determine if a full search should be performed 158. If not stale, the shallow search result and filtered result are directed to a result merger 168 that combines the two sets of results (by eliminating duplicates) to produce a final merged result returned to the user.

The staleness test 166 may be based on the age of the cache result or other properties of the cached result, though if so it may be desirable to optimize an implementation by incorporating a non-shallow-query based staleness test into the retrieval mechanism 154 so as to avoid unnecessary work by immediately performing a full query 158. The staleness test 166 may also test properties of the filtered results.

In addition, it may incorporate an alternative strategy by taking path 158 if the best answer in the shallow result is worse than the best answer in the cached result, or alternatively, worse than the best answer in the filtered cached result. Or the staleness test 166 may incorporate a different strategy by taking path 158 if the best answer in the shallow result has a different value than the best answer in the cached result.

Importantly, the staleness test 166 may be omitted, so that path 158 is never taken. This might be desirable in a system that can not afford to perform full LFSes during periods when resources are critically scarce, and that uses separate methods to populate the cache database (such as preemptive cache filling during periods of low use). In effect such an architecture uses the cached answers to improve the quality of the shallower but shallower search results that are performed "on-line" when queries are received. This is particularly effective when the cached answer filter is a re-query filter with updating as in FIG. 7 or 8.

When query widening is used, typically the original (narrow) query will be used for the shallow search, and the (wider) cached result filtered by the narrow query prior to result merging.

Some travel planning systems can perform flight pricing queries in conjunction with an LFS query using fewer resources than if the different queries had been performed separately, by sharing work between the queries. For example, the TPS described in U.S. Pat. No. 6,295,521 and assigned to the assignee of the present invention answers LFS queries by enumerating a set of possible flight combinations for the query; and while finding prices for all the flight combinations, thus sharing work between the multiple flight combinations.

Such a TPS can be extended so that the flight combinations from separate flight pricing queries are added to the flight combinations generated by the normal LFS flight combination enumeration process, so that the pricing stage of the LFS simultaneously calculates prices for both the LFS and the flight pricing queries. A TPS with such capabilities permits an optimized caching architecture in which the LFS performed by the shallow search process is also performed with any re-querying performed by the cached answer filter.

If a TPS has idle resources, the TPS can preemptively pose likely queries and cache the results, so that subsequent queries are more likely to hit the cache (resulting in low query latencies). In general the choice of what queries to pose is best guided by the distribution of queries likely to be made by users and the staleness of queries currently in the cache. Since the primary cause of staleness is the changing travel database, one possible strategy for filling the cache is to index cache entries (either the queries or the results) by the database entries they are likely to be highly dependent on. For example, if the fares or flights in a particular market change then queries in that market should be targeted for re-querying, since those queries are the ones most likely to have become stale. Alternatively and more directly, queries could be targeted if the answers included in their results use database elements that have changed.

Suppose for example that a travel planning system is used for flexible date queries where the only components of the query are the origin airport, destination airport, and month of travel (for a total of perhaps 120,000 possible queries). If the TPS can answer 3 queries per second, then during underutilized portions of the day the TPS can iterate through the 120,000 possible queries, preemptively computing and caching answers. However since it will take many hours to finish all possible queries, it makes sense to prioritize them based on the likelihood that the queries will be posed (perhaps by favoring queries between heavily-populated cities) and the likelihood the queries are stale (perhaps determined by the time since the query was last cached, and whether any of the fares or flights published between the query's endpoints have changed since the query was last cached).

In cases where the space of possible queries is too large to loop through, it may still be desirable to use idle resources to preemptively fill the cache with answers to the most commonly posed queries, or to periodically refresh queries already cached on the basis that they are the queries most likely to be re-posed.

It may be desirable to increase the search depth of queries posed preemptively relative to those queries computed as a result of a cache miss. When resources are idle it may be more practical to search deeply (consuming more resources) than when the TPS is being heavily used. This is an especially advantageous approach when the cached results are re-queried and when the shallow search with merging strategy is used. The net effect is to benefit from deeper searches without the computational expense of performing them for every query.

Many of the techniques disclosed are most powerful when used in combination. For example, preemptive cache filling is effective when query widening is used, because query widening reduces the number of preemptive queries that need to be performed to achieve a given cache hit rate. Additionally, shallow search with merging is most effective when the cached result is tested using re-query tests. Also, re-query tests based on routes are especially effective when full searches are only performed rarely, as with preemptive cache filling, since route information is likely to remain stable over longer periods than flight information.

The caching techniques can be used either by a client program (such as a travel web site) that poses queries to a travel planning system (such as a airline computer reservation system), or by the travel planning system. However, the travel planning system may be better able to take advantage of caching than the client program because it accepts queries from multiple clients and therefore has a higher query rate, and thus a greater chance of encountering duplicate queries.

Directly testing for the staleness of queries against the travel database is most efficiently performed by the travel planning system since it has easier access to the travel database but this does not preclude client programs from using direct testing if the travel planning system provides its clients with access to the travel database. TPS client programs may find estimation tests and re-querying to be more practical methods for detecting the staleness of results.

Figure 10:
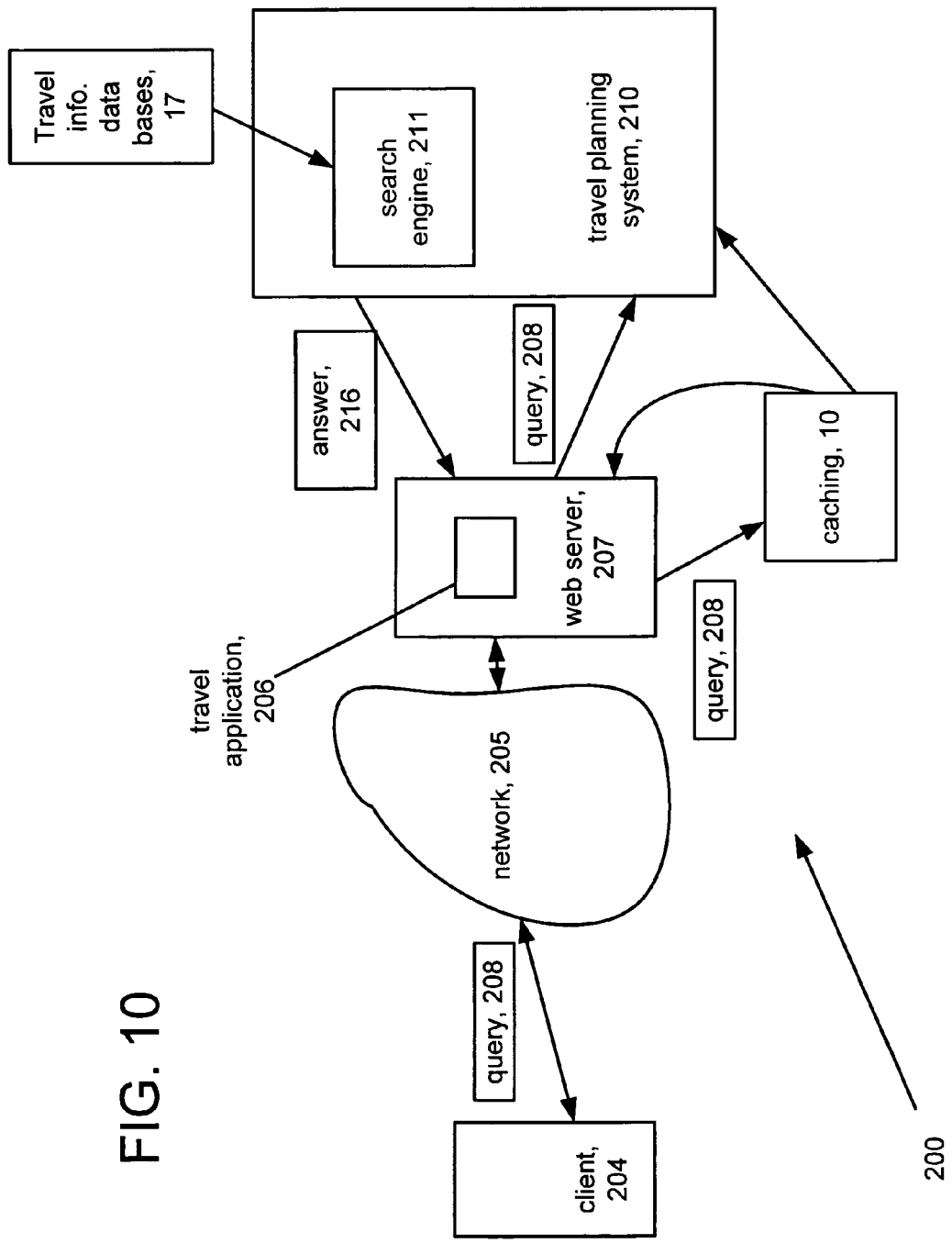
FIG. 10 is a block diagram depicting an architecture for travel planning.

Referring to FIG. 10, a system architecture 200 for travel planning includes a caching arrangement 10 (FIGS. 1-9) to cache travel query answers 216. A user such as a traveler, travel agent or airline reservation agent enters trip information typically including date and airport (i.e. origin and destination) information from a client system 204 into a travel application 206. The client 204 can run a browser or other interface and can be a travel agent terminal, an Internet web browser connected to a travel web site, and so forth. Queries 208 from the client are fed via a network 205 to the travel application 206. Network 205 can be any type of network such as a public network such as the Internet or telephone system or a private network such as a local area network (LAN), wide area network (WAN), virtual private network (VPN), and so forth. The travel application 206 typically resides on a web server 207. To process the queries, the travel application 206 can retrieve answers from a cache arrangement 10 (FIGS. 1-9) of answers 216 to queries or send the query to the travel-planning computer for processing by a search engine 211. Thus, either the travel planning computer 210 or the cache 10 can return results.

The travel application 206 interprets queries 208 that arrive from the client 204, sends the queries 208 to a travel planning computer 210 or the cache 10 (as discussed above) and, organizes the results from the travel computer 210 or cache 10 into a formatted output such as HTML, and sends the results back to the client 204. The travel application 206 composes query information into an appropriately formatted query, e.g., a low-fare-search query 208, which is sent to a travel planning system 210 or cache 10. The travel planning system 210 includes a search engine or search process 211 that searches for flight and fare combinations that satisfy the query, when the results from the query cache are not reliable or where there is a cache miss. The search engine could of course provide results, letting the arrangement 200 bypass the cache. The search performed by the search engine 211 in the travel planning systems 210 can use any of several known techniques.

A number of embodiments of the invention have been described. Nevertheless, it will be understood that various modifications may be made without departing from the spirit and scope of the invention. Accordingly, other embodiments are within the scope of the following claims.

What is claimed is:

1. A method for testing freshness of query results in a travel planning query cache comprising:

retrieving from a cache database a result comprising a set of answers, each answer including a flight and a fare usable with the flight, in response to a travel planning query;

testing the retrieved result to determine whether at least one answer in the result is stale or insufficiently fresh to be returned as an answer to the query, with testing using the travel planning query, the retrieved cached result and age of the retrieved cached result to determine whether answers in the retrieved cache result are stale or insufficiently fresh to return the result to a user; and if at least one of the answers in the retrieved cache result is stale, sending the travel planning query to a travel planning system; and storing a result from execution of the travel planning query in the cache database, with the result comprising a set of answers, each answer including a flight and a fare usable with the flight.

2. The method of claim 1 wherein testing staleness uses statistical tests based on previously tabulated probabilities of staleness.

3. The method of claim 1 wherein testing staleness separately tests whether cached answers are valid and whether better answers are likely to exist.

4. The method of 1 further comprising:
testing of validity of cached result by testing validity of cached answers that comprise the cached result.

5. The method of claim 1 wherein testing validity of cached answers comprises:
testing staleness by proportion or number of invalid answers.

6. The method of claim 5 wherein only a subset of the cached answers are tested for validity to determine whether the cached result is stale.

7. The method of claim 6 wherein testing validity of cached answers comprises:
testing whether flights, fares or availability in key markets have changed.

8. The method of claim 1 wherein testing validity of cached answers comprises:
testing whether flights, fares or availability in key markets have changed.

9. The method of claim 1 wherein testing validity of cached answers comprises:
testing whether answer components remain valid by examining current contents of travel database.

10. The method of claim 1 wherein testing validity of cached answers comprises:
testing validity of cached answers by re-querying using the travel planning query.

11. The method of claim 1 wherein testing validity of cached answers comprises:
testing validity of cached answers by re-querying using flight pricing queries.

12. The method of claim 1 wherein, testing staleness of the at least one cached answers comprises:
performing a shallow query and comparing resulting answers with the cached results.

13. A computer program product residing on a computer readable medium for testing freshness of query results in a travel planning query cache comprises instructions for causing a computer to:
retrieve from a cache database a result comprising a set of answers, each answer including a flight and a fare usable with the flight, in response to a travel planning query;
test the retrieved result to determine whether at least one answer in the result is stale or insufficiently fresh to be returned as an answer to the travel planning query, with the instructions to test using the travel planning query, the retrieved cached result and age of the retrieved cached result to determine whether answers in the retrieved cache result are stale or insufficiently fresh to return the result to a user; and if at least one of the answers is stale or insufficiently fresh,
send the travel planning query to a travel planning system; and store a result from execution of the travel planning query in the cache database, the result comprising a set of answers, each answer including a flight and a fare usable with the flight.

14. The computer program product of claim 13 wherein instructions to test the result for staleness uses statistical tests based on previously tabulated probabilities of staleness.

15. The computer program product of claim 13 wherein instructions to test the result for staleness separately tests whether cached answers are valid and whether better answers are likely to exist.

16. The computer program product of claim 13 further comprising instructions to:
test validity of cached result by testing validity of cached answers that comprise the cached result.

17. The computer program product of claim 13 wherein instructions to test validity of cached answers comprises instructions to:
test staleness by proportion or number of invalid answers.

18. The computer program product of claim 17 wherein only a subset of the cached answers are tested for validity to determine whether the cached result is stale.

19. The computer program product of claim 18 wherein instructions to test validity of cached answers comprises instructions to:
test whether flights, fares or availability in key markets have changed.

20. The computer program product of claim 13 wherein instructions to test validity of cached answers comprises instructions to:
test whether flights, fares or availability in key markets have changed.

21. The computer program product of claim 13 wherein instructions to test validity of cached answers comprises instructions to:
test whether answer components remain valid by examining current contents of travel database.

22. The computer program product of claim 13 wherein instructions to test validity of cached answers comprises instructions to:
test validity of cached answers by re-querying.

23. The computer program product of claim 13 wherein instructions to test validity of cached answers comprises instructions to:
test validity of cached answers by re-querying using flight pricing queries.

24. The computer program product of claim 13 wherein instructions to test validity of cached answers comprises instructions to:
perform a shallow query and comparing resulting answers with the cached results.

25. A travel planning system comprises:
a cache database, storing results comprising a set of answers to travel planning queries, each answer including a flight and a fare usable with the flight; and
a computing system executing:
a management process that retrieves cached results from the cache database in response to a travel planning query,
tests the retrieved cached result to determine whether at least one answer in the result is stale or insufficiently fresh to be returned as an answer to the query, with the management process testing validity of cached answers by determining staleness according to a proportion or number of invalid answers in the retrieved result exceeding a pre-determined threshold; and if at least some of the answers are stale or insufficiently fresh, and the threshold is exceeded, send the travel planning query to a travel planning system; and store a result from execution of the travel planning query in the cache database, the result comprising a set of answers, each answer including a flight and a fare usable with the flight.

26. The travel planning query cache of claim 25 wherein the management process tests the result for staleness using the query, cached result and age of the cached result to determine whether the result is stale or sufficiently fresh to be returned to a user.

27. The travel planning query cache of claim 25 wherein the management process tests the result for staleness using statistical tests based on previously tabulated probabilities of staleness.

28. The travel planning query cache of claim 25 wherein the management process tests the results for staleness separately, and tests whether cached answers are valid and whether better answers are likely to exist.

29. The travel planning query cache of claim 25 wherein the management process further tests validity of cached result by testing validity of cached answers that comprise the cached result.

30. The travel planning query cache of claim 25 wherein the management process only tests a subset of the cached answers for validity to determine whether the cached result is stale.

31. The travel planning query cache of claim 30 wherein the management process tests validity of cached answers by testing whether flights, fares or availability in key markets have changed.

32. The travel planning query cache of claim 25 wherein the management process tests validity of cached answers by testing whether flights, fares or availability in key markets have changed.

33. The travel planning query cache of claim 25 wherein the management process tests validity of cached answers by testing whether answer components remain valid by examining current contents of travel database.

34. The travel planning query cache of claim 25 wherein the management process tests validity of cached answers by testing validity of cached answers by re-querying.

35. The travel planning query cache of claim 25 wherein the management process tests validity of cached answers by testing validity of cached answers by re-querying using flight pricing queries.

36. The travel planning query cache of claim 25 wherein the management process tests validity of cached answers by performing a shallow query and comparing resulting answers with the cached results.

* * * * *